(12) United States Patent
Kazmi et al.

(10) Patent No.: US 9,788,171 B2
(45) Date of Patent: Oct. 10, 2017

(54) METHODS FOR SERVICE ACQUISITION IN DEVICE-TO-DEVICE OPERATION

(71) Applicant: Telefonaktiebolaget LM Ericsson (publ), Stockholm (SE)

(72) Inventors: Muhammad Kazmi, Bromma (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/117,093

(22) PCT Filed: Aug. 11, 2014

(86) PCT No.: PCT/SE2014/050929
§ 371 (c)(1),
(2) Date: Aug. 5, 2016

(87) PCT Pub. No.: WO2015/122820
PCT Pub. Date: Aug. 20, 2015

(65) Prior Publication Data
US 2017/0171724 A1    Jun. 15, 2017

Related U.S. Application Data

(60) Provisional application No. 61/938,330, filed on Feb. 11, 2014.

(51) Int. Cl.
*H04W 4/08* (2009.01)
*H04W 76/02* (2009.01)
(Continued)

(52) U.S. Cl.
CPC .......... *H04W 4/08* (2013.01); *H04L 67/1061* (2013.01); *H04W 8/005* (2013.01); *H04W 76/02* (2013.01);
(Continued)

(58) Field of Classification Search
CPC ....... H04W 4/08; H04W 8/005; H04W 76/02; H04W 76/023; H04W 84/18; H04W 92/18; H04L 67/1061
(Continued)

(56) References Cited

U.S. PATENT DOCUMENTS

2003/0041141 A1   2/2003  Abdelaziz et al.
2011/0258313 A1  10/2011  Mallik et al.
(Continued)

FOREIGN PATENT DOCUMENTS

EP         2 665 298       11/2013
WO     WO 2011/098128      8/2011
(Continued)

OTHER PUBLICATIONS

PCT International Preliminary Report on Patentability for International application No. PCT/SE2014/050929—May 20, 2016.
(Continued)

*Primary Examiner* — Raymond Dean
(74) *Attorney, Agent, or Firm* — Baker Botts, LLP

(57) ABSTRACT

In some embodiments, a radio network node operable to group physical identities being used or expected to be used by wireless communication devices under the control of the radio network node into one or more groups. At least one of the groups is mapped to one or more service types associated with device-to-device services being offered or expected to be offered by the wireless communication devices. The radio network node sends grouping information that indicates the physical identities and the service type(s) for each of one or more of the groups.

15 Claims, 12 Drawing Sheets

(51) Int. Cl.
H04W 8/00 (2009.01)
H04L 29/08 (2006.01)
H04W 92/18 (2009.01)
H04W 84/18 (2009.01)

(52) U.S. Cl.
CPC ......... *H04W 76/023* (2013.01); *H04W 84/18* (2013.01); *H04W 92/18* (2013.01)

(58) Field of Classification Search
USPC ...................................... 455/41.2
See application file for complete search history.

(56) References Cited

U.S. PATENT DOCUMENTS

| | | | |
|---|---|---|---|
| 2013/0188515 A1 | 7/2013 | Pinheiro et al. | |
| 2014/0206348 A1* | 7/2014 | Johnsson | H04W 8/005 455/434 |

FOREIGN PATENT DOCUMENTS

| | | | |
|---|---|---|---|
| WO | 2013 171113 A1 | 11/2013 | |
| WO | 2014 005330 A1 | 1/2014 | |

OTHER PUBLICATIONS

PCT International Search Report for International application No. PCT/SE2014/050929—Oct. 3, 2014.
Examination Report No. 1 for Standard Patent Application issued by the Australian Government for Application No. 2014382718—dated Jun. 27, 2017.

* cited by examiner

120

METHODS FOR SERVICE ACQUISITION IN DEVICE-TO-DEVICE OPERATION

PRIORITY

This nonprovisional application is a U.S. National Stage Filing under 35 U.S.C. §371 of International Patent Application Serial No. PCT/SE2014/050929 filed Aug. 11, 2014, and entitled "Methods For Service Acquisition In Device-To Device Operation" which claims priority to U.S. Provisional Patent Application No. 61/938,330 filed Feb. 11, 2014, both of which are hereby incorporated by reference in their entirety.

TECHNICAL FIELD

The invention relates, in general, to wireless communications and, more particularly, to methods for service acquisition in device-to-device operation.

BACKGROUND

In a wireless communication network, device-to-device (D2D) communication refers to direct communication between wireless communication devices. D2D communication may be conducted between a first wireless communication device, such as a beneficiary device that receives a D2D service, and a second wireless communication device, such as a serving device that provides the D2D service to the beneficiary device. To use a D2D service, the beneficiary device must first determine which of the other D2D devices in the network can act as the serving device. In existing solutions, the processes used by the beneficiary device to discover the serving device may be inefficient.

One existing solution for determining D2D services offered by another wireless communication device involves acquiring higher layer information transmitted by that device. For example, the serving device broadcasts information about its service offerings on a beacon channel or any channel carrying system information (SI), such as a physical uplink shared channel (PUSCH) or other physical channel. The beneficiary device receives and fully decodes the physical channel carrying the SI associated with the services. Typically, to maintain acceptable implementation complexity, a D2D wireless communication device can receive one physical channel at a time because simultaneous reception of two or more physical channels may require multiple receivers. In practice, the beneficiary device will have to acquire the SI of multiple D2D devices since not all are likely to offer the same services (e.g., some D2D devices may offer the service desired by beneficiary device and other D2D devices may not offer the desired service). Reading and decoding the higher layer SI information one device at a time means the time to determine an appropriate serving D2D device may become substantially long. As a result, battery life of the beneficiary device may be degraded and processing at the beneficiary device may increase. Complexity may further increase as more D2D devices become involved, for example, if a device X operates as a beneficiary D2D device with respect to one device Y while device X operates as a serving D2D device with respect to another device Z. Even if device X is capable of multi-user detection/successive interference cancellation (MUD/SIC), it may not be able to read a beacon channel of device Y (a potential serving device) to inquire about its offered service and simultaneously receive data (e.g., PUSCH) from device Z.

Another existing solution attempts to reduce the complexity at the beneficiary device, by offering a network-assisted approach to finding a serving D2D device. In this approach, the beneficiary device tells the cellular network/base station the D2D service that the beneficiary device would like to use. The network responds by telling the beneficiary device the D2D device(s) offering the desired service. This approach involves a high amount of dependence on the network because the beneficiary device obtains information about other D2D devices from the network rather than from the devices themselves. This can increase the signalling overhead in the network and may be inefficient when the beneficiary device lacks sufficient network coverage.

Both of the existing solutions described above involve further problems because they assume a static association between some device or service identity (expression) and the actual service offered. This makes existing solutions inflexible because such association cannot be readily changed even though more services may be needed in future or a particular device may change its service offerings.

SUMMARY

To address the foregoing problem in the prior art, disclosed is a radio network node operable to group physical identities being used or expected to be used by wireless communication devices under the control of the radio network node into one or more groups. At least one of the groups is mapped to one or more service types associated with device-to-device services being offered or expected to be offered by the wireless communication devices. The radio network node sends grouping information that indicates the physical identities and the service type(s) for each of one or more of the groups.

Also disclosed is a wireless communication device operable to receive the grouping information from the radio network node and use the grouping information in connection with device-to-device services. In certain embodiments, the wireless communication device uses the grouping information to select a physical identity that maps to the service types being offered by the wireless communication device. The wireless communication device sets the selected physical identity as its identifier and transmits the selected physical identity as an indicator of the service types being offered by the wireless communication device. In certain embodiments, the wireless communication device uses the grouping information to select a second wireless communication device to participate in a desired device-to-device service. The second wireless communication device is selected based on having a physical identity that maps to the service type of the desired device-to-device service.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
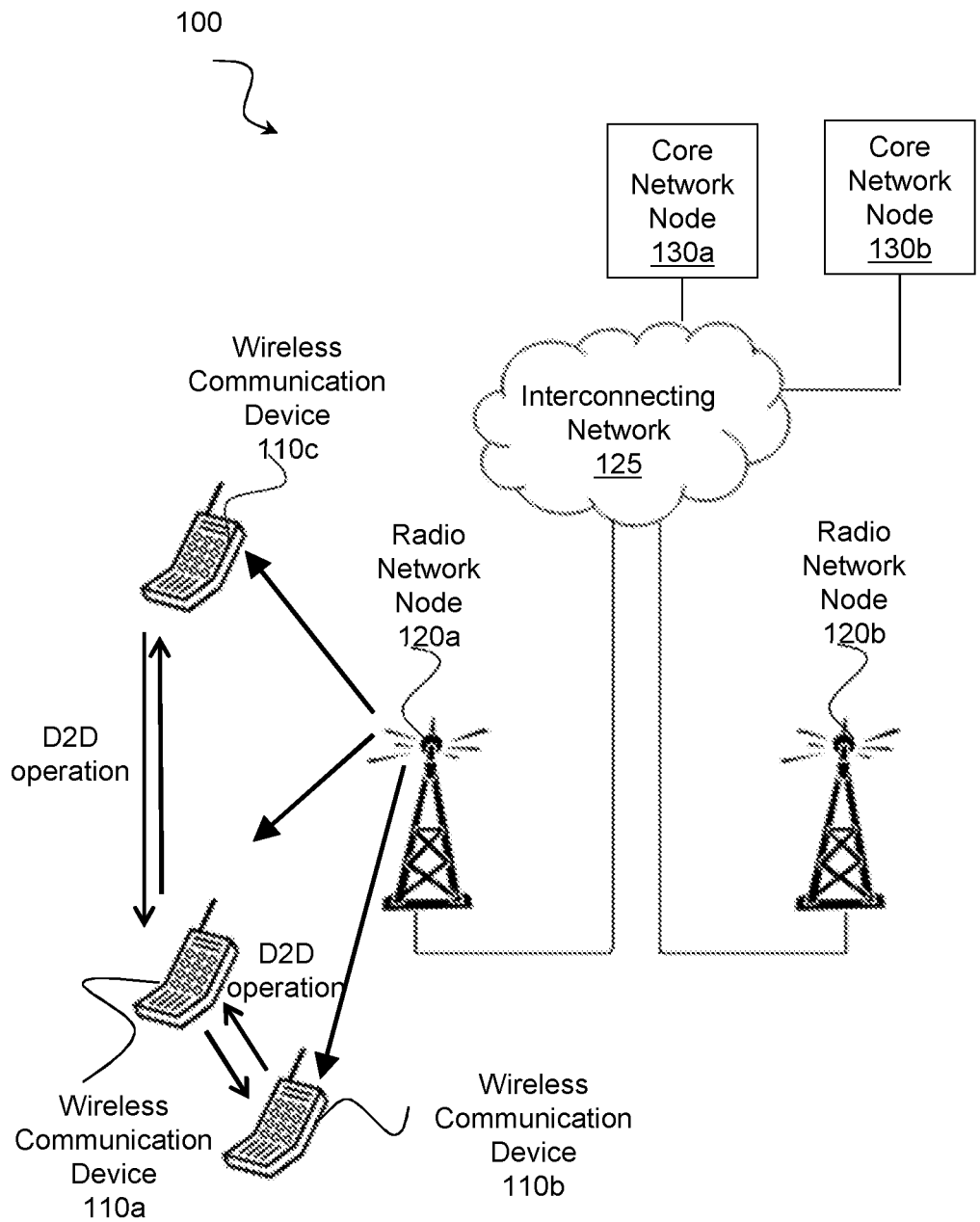
FIG. 1 is a block diagram illustrating an example of a wireless network.

FIG. 1 is a block diagram illustrating an example of a wireless network 100 that includes one or more wireless communication devices 110 and a plurality of network nodes. The network nodes include radio network nodes 120 (such as a base station or eNodeB) and core network nodes 130. Wireless communication devices 110a-110c communicate with radio network node 120a over a wireless interface. For example, wireless communication device 110a transmits wireless signals to radio network node 120a and/or receives wireless signals from radio network node 120a. The wireless signals contain voice traffic, data traffic, and control signals, for example. Core network node 130 manages the establishment of communication sessions and various other functionality for wireless communication device 110. The network nodes connect through interconnecting network 125, which refers to any interconnecting system capable of transmitting audio, video, signals, data, messages, or any combination of the preceding. Examples of wireless communication device 110, radio network node 120, and core network node 130 are described with respect to FIGS. 8, 9, and 10, respectively.

Wireless communication devices 110a-110c may participate in device-to-device (D2D) communication. As an example, in certain circumstances, wireless communication device 110a may act as a beneficiary device that receives a D2D service and wireless communication device 110b may act as a serving device that provides the D2D service. Some non-limiting examples of D2D services include public safety and disaster relief (also known as national security and public safety (NSPS)), relaying function for coverage extension, proximity based social networking, cooperative positioning, and so on.

Examples of public safety and disaster relief services include Public Warning Systems (PWS). Public warning systems may refer to a range of technical solutions and standards that facilitate warning of the public in case of a disaster or public safety situation, such as an earthquake or large accidents, which can be manmade, natural or accidental. An example of PWS in 3GPP for cellular communication, for example, includes wireless system parts and communication protocols called Earthquake and Tsunami Warning System (ETWS) that specifically addresses disaster situations due to earthquake, tsunami, or other natural catastrophes. Another example of a PWS may include a Commercial Mobile Alert System (CMAS) that can communicate alert signals to cellular users that are under the coverage area of a cellular infrastructure. Similar PWS can be extended to D2D communication where a D2D wireless communication device 110 can provide such information to other D2D wireless communication devices 110 via peer-to-peer communication or via a group call. For example, the 3GPP SA1 working group is studying the feasibility of Proximity Services (ProSe) for national security and public safety use cases (see the technical report 3GPP TR 22.803 "Proximity Services (ProSe)"). Such proximity services can be provided by direct device-to-device (also called LTE Direct) communications in which two or more wireless communication devices 110 communicate via a direct communication link, rather than communicating through a cellular base station (BS) or a wireless local area network (WLAN) access point (AP).

As an example of a relaying function, a D2D wireless communication device 110a acts as an intermediate node capable of forwarding information received from one D2D wireless communication device 110b to another D2D wireless communication device 110c. A D2D wireless communication device 110c would typically require relaying assistance in case it cannot directly communicate with the target D2D wireless communication device 110b (or group of D2D wireless communication devices 110) or momentarily is unable to establish a direct communication link with the target D2D wireless communication device 110b (or group of D2D wireless communication devices 110). The intermediate D2D wireless communication device 110a may relay the received information to the destined D2D wireless communication device 110c either transparently or after decoding and analyzing the contents of the received message.

Examples of social networking D2D services include sending and/or receiving a wide range of personal data or information such as email, text messages, etc.

As an example of cooperative positioning, D2D wireless communication devices 110 exchange positioning related data or signals with their peers so that not all devices 110 need to be able to receive positioning signals from the satellite or ground-based infrastructure. For example, a wireless communication device 110a in a GNSS-hostile environment (e.g., indoors) or without GNSS capability receives aiding data from nearby GNSS capable wireless communication device 110b. Wireless communication device 110b may determine its own position and assist wireless communication device 110a to determine its position.

In some D2D scenarios, wireless communication devices 110 themselves constitute the radio access network such that wireless communication devices 110 are not required to communicate via a radio network node 120 (e.g., an infrastructure node, such as a cellular base station or a wireless access point). In other D2D scenarios, wireless communication devices 110 operate within a radio access network made up of radio network nodes 120. Wireless communication devices 110 in the vicinity of each other can establish and communicate over a direct radio link (D2D bearer). Wireless communication devices can also maintain a connection with their respective radio network node 120.

Radio network node 120 can assist and supervise wireless communication devices 120 in allocating time, frequency, and code resources for the D2D bearer. Also, the radio access network may assist in Radio Resource Management (RRM) and may control mode selection to decide whether the D2D pair should communicate over the direct D2D link or over a link to the radio network node 120. For example, the network may control network offloading, where the load on radio network nodes 120 may be reduced by instructing nearby devices 110 to exchange user plane data directly using D2D and without sending the user plane data via a base station. The network may also set the maximum power level that the D2D pair may use for the D2D bearer. Thus, network assisted D2D communications may take advantage of the short distances between devices 110 and reuse radio spectrum while at the same time protecting the network (e.g., the cellular layer) from potentially harmful interference caused by the D2D link.

To use D2D services, a wireless communication device 110a must first determine another wireless communication device 110b that offers the desired D2D service. Particular embodiments of the present disclosure provide techniques that allow wireless communication device 110a to efficiently determine the D2D services offered by wireless communication device 110b. In some embodiments, radio network node 120 dynamically assists beneficiary device 110a in learning the available services based on a physical identity of serving device 110b. Thus, wireless communication device 110a may determine the D2D service offerings of wireless communication device 110b without being required to decode entire higher layer system information from a beacon transmitted by wireless communication device 110b.

Figure 2:
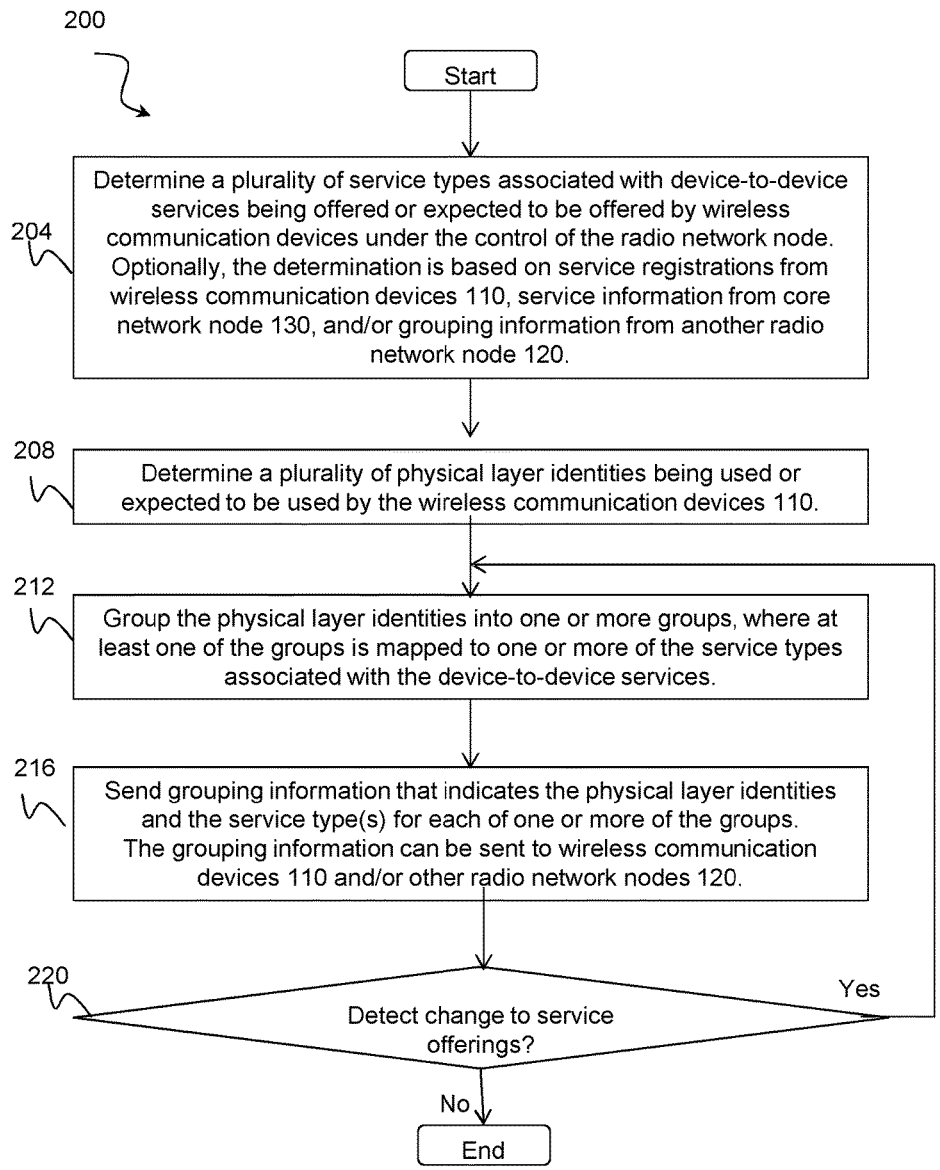
FIG. 2 is a flow diagram illustrating an example method for facilitating service acquisition in device-to-device operation.

FIG. 2 is a flow diagram illustrating an example method 200 for facilitating service acquisition in device-to-device operation. The method begins at step 204 where radio network node 120 determines a plurality of service types associated with device-to-device services being offered or expected to be offered by wireless communication devices 110 under the control of radio network node 120. In some embodiments, a service may be considered under the control of radio network node 120 if the wireless communication device 110 providing or receiving the service is within the coverage area of radio network node 120 such that wireless communication device 110 is able to obtain grouping information from radio network node 120 and use the grouping information in connection with device-to-device services.

Optionally, radio network node 120 determines the device-to-device services being offered or expected to be offered based on service registrations from wireless communication devices 110 (examples of which are described with respect to FIGS. 3A-3C below), service information from core network node 130 (examples of which are described with respect to FIGS. 4A-4C), grouping information from another radio network node 120 (examples of which are described with respect to FIGS. 5A-5C), or any combination of the preceding.

At step 208, radio network node 120 determines a plurality of physical identities being used or expected to be used by the wireless communication devices 110. In some embodiments, the physical identity corresponds to a Local Device Identity (LDID). In some embodiments, radio network node 120 can determine the physical identities from its configuration settings. Radio network node 120 may optionally exclude physical identities that are already being used and/or physical identities that are reserved.

Examples of physical identities include identities that a first D2D wireless communication device 110a encodes with or maps to the physical signal that it transmits to assist a peer/second D2D wireless communication device 110b in synchronizing to the first wireless communication device 110a. Examples of the physical signal include pilot or reference signal (e.g., sounding reference signal (SRS)), synchronization signal (e.g., PSS/SSS), etc. Particular embodiments may provide a large number of physical identities, such as several hundred physical identities, which may be reused in every cell. As an example, physical identities for wireless communication devices 110 based on LTE PSS/SSS sequences may number up to 504.

At step 212, radio network node 120 groups the physical identities into one or more groups. Each group of physical identities maps to one or more service types. At least one of the groups includes a device-to-device service type. The grouping may be made according to the full physical identity or according to a portion of the physical identity, such as the preamble. Each group may include any suitable number of service types. For example, one group may include a single service type (such as NSPS) and another group may include two service types (such as NSPS and relaying function).

The step of grouping physical identities (which may also be referred to as partitioning physical identities) and mapping them to service types may be performed on a semi-static basis, for example, on the order of a few seconds up to minutes. The mapping may also be updated on a dynamic basis, for example, on the order of a few frames. The choice between semi-static and dynamic update may depend upon the rate at which the proportions of different services offered by wireless communication devices 110 change and/or the rate at which existing D2D wireless communication devices 110 leave or new D2D wireless communication devices 110 enter in the cell defined by radio network node 120.

To enable mapping between the group of physical identities and services, different services or groups of services may be assigned pre-defined identifiers, such as service IDs. An example of pre-defined mapping between service type and service IDs is shown in table 1:

TABLE 1

Identifier to identify service type

| Service Type | Service Identifier |
|---|---|
| NSPS | 0 |
| Relaying function | 1 |
| Social networking | 2 |
| Cooperative positioning | 3 |
| No specific service | 4 |
| ... | ... |
| Reserved for future service | N |

In the example, the service type for one of the groups is a no_service type (no specific service). The no_service type indicates that the physical identities in the group do not provide information about the device-to-device services being offered or expected to be offered.

An example of pre-defined mapping between multiple service types per service ID is shown in table 2:

TABLE 2

Identifier to identify group of services

| Service Type | Service Group Identifier |
|---|---|
| NSPS and cooperative positioning | N + 1 |
| NSPS and relaying function | N + 2 |
| NSPS, relaying function and cooperative positioning | N + 3 |
| Social networking | N + 4 |
| Any pre-defined service | N + 5 |
| No specific group of services | N + 6 |
| . . . | . . . |
| Reserved for future group of services | N + M |

The following examples elaborate the mapping between the physical identities and service type(s). Assume radio network node 120 determines that NSPS services are expected to be offered by 80% of D2D wireless communication devices 110 and relaying services are expected to be offered by 20% of D2D wireless communication devices 110 (which may be determined based on the principles in step 204 above). Further assume that 200 physical identities are available for D2D wireless communication devices 110 in the cell. In this case, radio network node 120 may map a first group of 160 physical identities to service ID 0 (i.e., 80% of the 200 UE physical IDs may be mapped to NSPS) and a second group of remaining 40 physical identities to service ID=1 (i.e., 20% of the 200 UE physical IDs may be mapped to relaying services). This is illustrated in table 3.

TABLE 3

Example mapping between wireless communication device physical identities and their service types

| Group of Physical Layer IDs | | Mapping to service type | |
|---|---|---|---|
| Group No. | Range of Physical Layer IDs | Service ID | Service type |
| 1 | 0 . . . 159 | 0 | NSPS |
| 2 | 160 . . . 199 | 1 | Relaying |

In another example, one set of D2D wireless communication devices 110 may offer certain type of services (e.g., social networking) and another set of D2D wireless communication devices 110 may not offer any type service (e.g., if D2D device 110 is only capable of acting as a beneficiary and not a serving device) or would not like to use the physical identity to announce the service being offered. Assuming equal split between these two types of wireless communication devices 110, the available 200 physical identities can be equally divided into two groups. One group of physical identities is mapped to service type # ID=3 (in the example, ID 3 corresponds to social networking) and the second group of physical identities is mapped to service type # ID=4 (in the example, ID 4 corresponds to no service is announced). This example is illustrated in table 4.

TABLE 4

Example mapping between wireless communication device physical identities and their service types

| Group of Physical Layer IDs | | Mapping to service type | |
|---|---|---|---|
| Group No. | Range of Physical Layer IDs | Service ID | Service type |
| 1 | 0 . . . 99 | 2 | Social networking |
| 2 | 100 . . . 199 | 4 | No service |

Continuing to step 216, radio network node 120 sends grouping information that indicates the physical identities and the service type(s) for each of one or more of the groups. The grouping information can be sent to other radio network nodes 120, as further described with respect to FIGS. 5A-5C below, and/or the grouping information can be sent to wireless communication devices 110, as further described with respect to FIGS. 6A-6C below.

In some embodiments, radio network node 120 may determine that there are insufficient D2D wireless communication devices that intend to announce their services. In response, radio network node 120 may use one of the following options. In a first option, radio network node 120 informs D2D wireless communication devices 110 that their physical identities are not linked to any service type. In a second option, radio network node 120 does not signal any grouping information to the D2D wireless communication devices 110. Based on a pre-determined rule, the D2D wireless communication devices 110 assume that their physical identities are not linked to any service type. As an example, the pre-determined rule may indicate to assume physical identities are not linked to any service type if the wireless communication device 110 does not receive grouping information from radio network node 120 within a pre-determined amount of time or in response to certain conditions. In a third option, radio network node 120 signals only one group of all available physical identities, where the entire group is linked to the no_service type.

At step 220, radio network node 120 detects whether a change has been made to the service offerings. For example, as wireless communication devices 110 change their service offerings or move in and out of radio network node 120's control, radio network node 120 may continue to receive service registrations from wireless communication devices 110, service information from core network node 130, and/or grouping information from other radio network nodes 120. Radio network node 120 can dynamically adjust the number of physical identities assigned to a particular group based on changes to the proportion of the wireless communication devices 110 that offer or are expected to offer the service type(s) associated with the particular group. Thus, if at step 220 radio network node 120 detects a change to the proportion of wireless communication devices 110 that offer or are expected to offer certain services, radio network node 120 may return to step 212 to adjust the grouping/partitioning accordingly and may then send the updated grouping information at step 216. In some embodiments, adjusting the grouping/partitioning may include deleting unused services or adding new services.

Figure 3A:
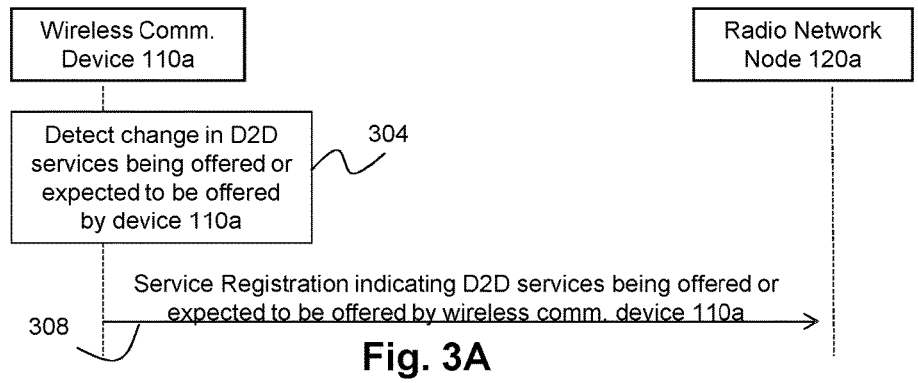
FIGS. 3A-3C are signalling diagrams illustrating example message flows whereby a wireless communication device informs a radio network node of device-to-device services offered by the wireless communication device.
Figure 3B:
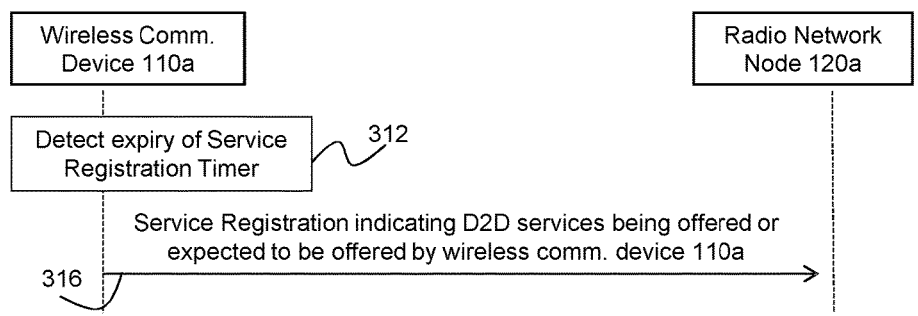
Figure 3C:
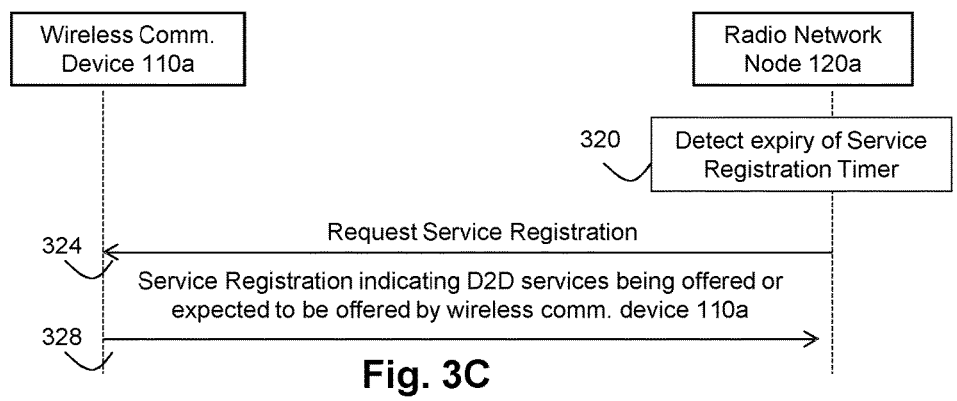

FIGS. 3A-3C are signalling diagrams illustrating example message flows whereby a wireless communication device 110 informs a radio network node 120 of device-to-device services offered by wireless communication device 110. In some embodiments, radio network node 120 receives the information in a service registration indicating one or more of the device-to-device services being offered or expected to be offered by wireless communication device 110 and includes the service types of the device-to-device services indicated by the service registration in at least one of the groups described above with respect to step 212 of FIG. 2.

FIG. 3A illustrates an example where at step 304 wireless communication device 110a detects a change in D2D services that it offers or expects to offer. As an example, wireless communication device 110a may detect that a user initiated a configuration change that causes wireless communication device 110a to begin to offer social networking D2D services. At step 308, wireless communication device 110a sends radio network node 120 a service registration indicating D2D services that it offers or expects to offer (e.g., social networking services).

FIG. 3B illustrates an example where at step 312 wireless communication device 110a detects expiry of a Service Registration Timer. In response to the timer expiry, at step 316 wireless communication device 110a sends radio network node 120 a service registration indicating D2D services that it offers or expects to offer. Thus, radio network node 120 is periodically informed of the services being offered or expected to be offered by wireless communication device 110a.

FIG. 3C illustrates an example in which a Service Registration Timer is monitored by radio network node 120. In response to detecting expiry of the Service Registration Timer at step 320, radio network node sends a request to wireless communication device 110a at step 324. The request asks wireless communication device 110a to send a service registration. Wireless communication device 110a responds at step 328 by sending a service registration to radio network node 120 that indicates the D2D services being offered or expected to be offered by wireless communication device 110a. The Service Registration Timer(s) described above may be configured to be monitored by radio network node 120, wireless communication device 110, or both.

After receiving the service registration (e.g., according to any of the techniques described with respect to FIGS. 3A-3C), radio network node 120 can maintain the service types indicated by the service registration for a pre-determined amount of time. For example, historical information about services offered by the D2D wireless communication devices 110 can be maintained for time period T. Based on such historical information, radio network node 120 assumes that certain D2D wireless communication devices 110 may offer the same service as offered in the past or offered most of the time over time period T. The historical information can also be updated on regular basis according to a timer, receipt of at least a threshold number of updates from devices 110 or other nodes (e.g., other radio network nodes 120 or core network nodes 130), or other suitable criteria.

Figure 4A:
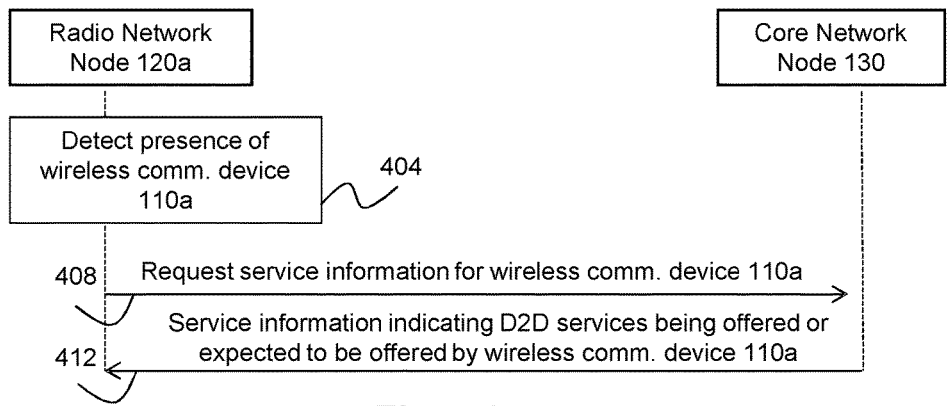
FIGS. 4A-4C are signalling diagrams illustrating example message flows whereby a core network node informs a radio network node of device-to-device services offered by a wireless communication device.
Figure 4B:
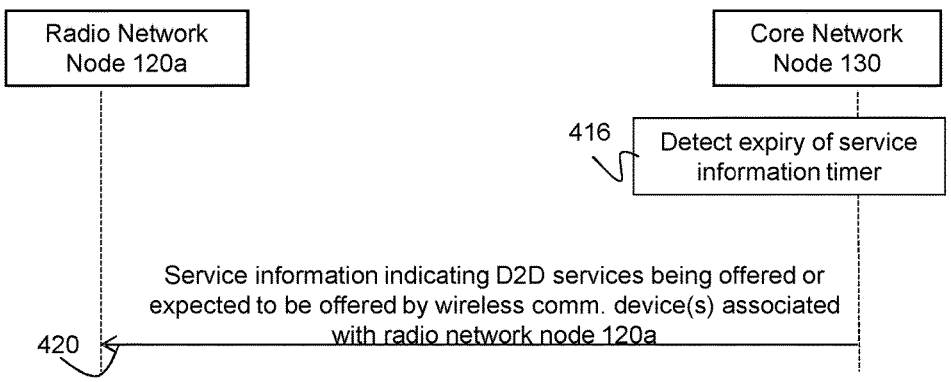
Figure 4C:
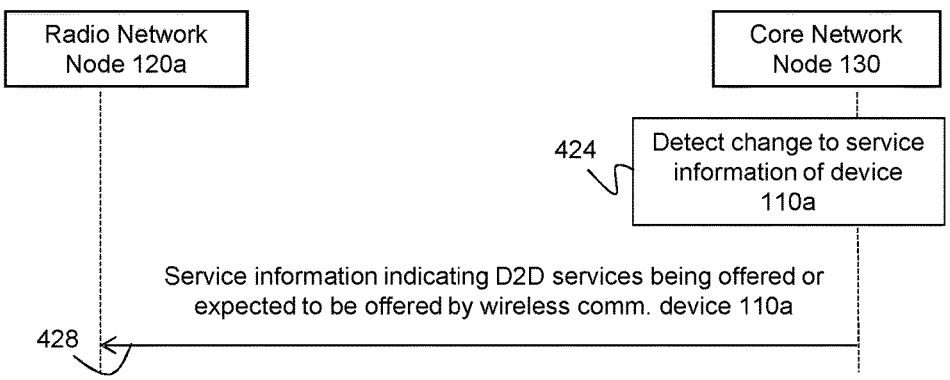

FIGS. 4A-4C are signalling diagrams illustrating example message flows whereby a core network node 130 informs a radio network node 120 of device-to-device services offered by a wireless communication device 110. For example, radio network node 120 receives service information indicating one or more of the device-to-device services being offered or expected to be offered by one of wireless communication devices 110 under the control of radio network node 120. In some embodiments, radio network node 120 includes the service types of the device-to-device services indicated by the service information in at least one of the groups described above with respect to step 212 of FIG. 2. In some embodiments, radio network node 120 maintains the service types of the device-to-device services indicated by the service information for a pre-determined amount of time after receiving the service information.

FIG. 4A illustrates an example where at step 404 radio network node 120a detects the presence of wireless communication device 110a, for example, when wireless communication device is active or expected to be served by radio network node 120. At step 408, radio network node 120a sends core network node 130 a request for service information associated with wireless communication device 110a. Core network node 130 determines the service information. For example, core network node 130 may access a database containing the service information. In some embodiments, the database contains entries that have been populated by a system administrator (e.g., whenever a user subscribes to a service) or by core network node 130 (e.g., upon receipt of the information from wireless communication device 110 or other network nodes having information for wireless communication device 110). At step 412, core network node 130 sends service information to radio network node 120a. The service information indicates D2D services being offered or expected to be offered by wireless communication device 110a.

FIG. 4B illustrates an example where at step 416 core network node 130 detects expiry of a service information timer and, in response, core network node 130 sends the service information to radio network node 120a at step 420. Thus, core network node 130 can periodically send service information updates to radio network node 120a. Although not illustrated, radio network node 120a could maintain a similar service information timer in order to periodically request updated service information from core network node 130.

FIG. 4C illustrates an example where at step 424 core network node 130 detects a change to service information of wireless communication device 110a. As an example, core network node 130 may detect that a system administrator changed a subscription associated with wireless communication device 110a. As another example, core network node 130 may detect receipt of a service registration from wireless communication device 110a indicating a change in its service offerings. In response, core network node 130 sends updated service information to radio network node 120a at step 428.

Figure 5A:
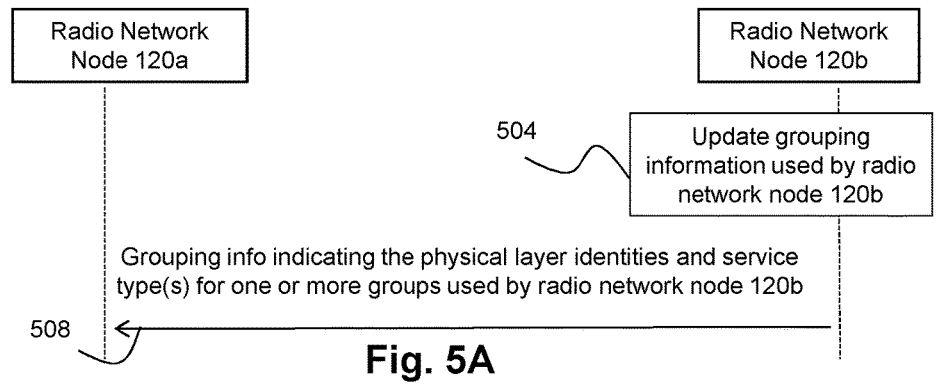
FIGS. 5A-5C are signalling diagrams illustrating example message flows where a first radio network node sends a second radio network node grouping information for device-to-device services under the control of first radio network node.
Figure 5B:
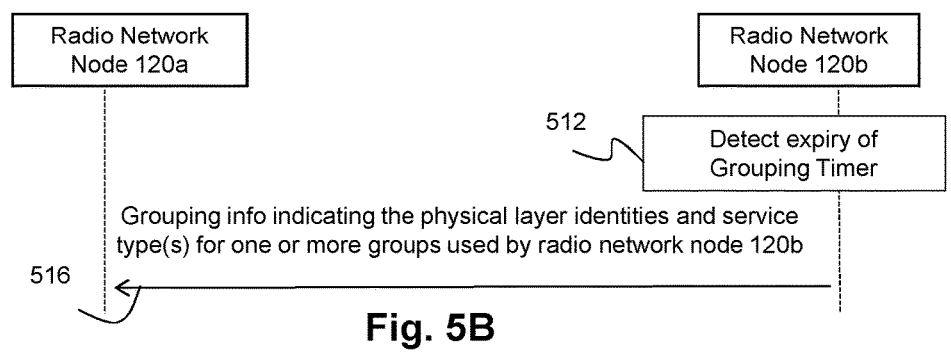
Figure 5C:
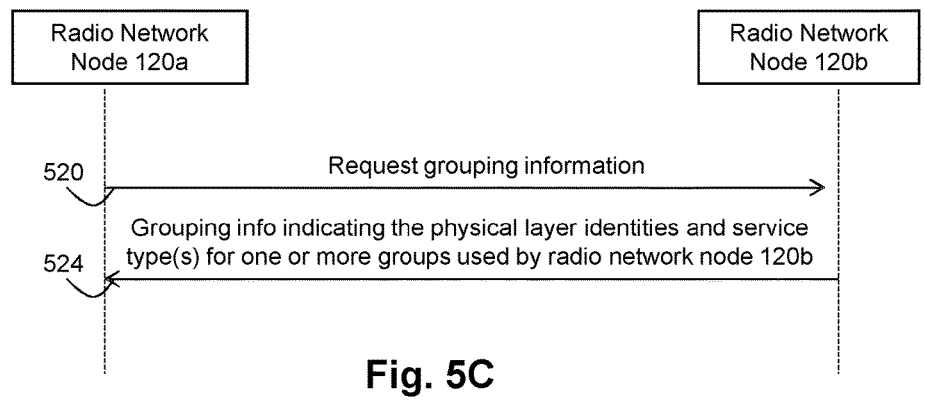

FIGS. 5A-5C are signalling diagrams illustrating example message flows where a radio network node 120b sends radio network node 120a grouping information for device-to-device services under the control of radio network node 120b. Radio network node 120a can refer to grouping information used by radio network node 120b when determining its own grouping. For example, if the radio network nodes 120a and 120b are neighbours, they may serve a similar mix of wireless communication devices 110 at a given time and may be able to use a similar mapping of physical identities to offered services.

FIG. 5A illustrates an example where radio network node 120b updates its grouping information at step 504. For example, radio network node 120b may update its grouping information dynamically in response to changes in the proportion of various services being offered by wireless communication devices 110 within the control of radio network node 120b. After updating its grouping information, radio network node 120b sends its grouping information to radio network node 120a.

FIG. 5B illustrates an example where radio network node 120b detects expiry of a grouping timer at step 512 and, in response, sends its grouping information to radio network node 120a at step 516.

FIG. 5C illustrates an example where at step 520 radio network node 120a requests grouping information from radio network node 120b. Radio network node 120a may send the request on an as-needed basis, in response to a timer expiry, or in response to any other suitable condition. At step 524, radio network node 120b responds by sending its grouping information to radio network node 120a.

Figure 6A:
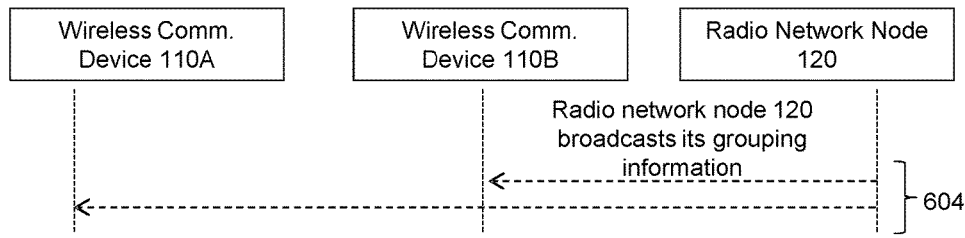
FIGS. 6A-6C are signalling diagrams illustrating example message flows where a radio network node sends a wireless communication device grouping information for device-to-device services under the control of the radio network node.
Figure 6B:
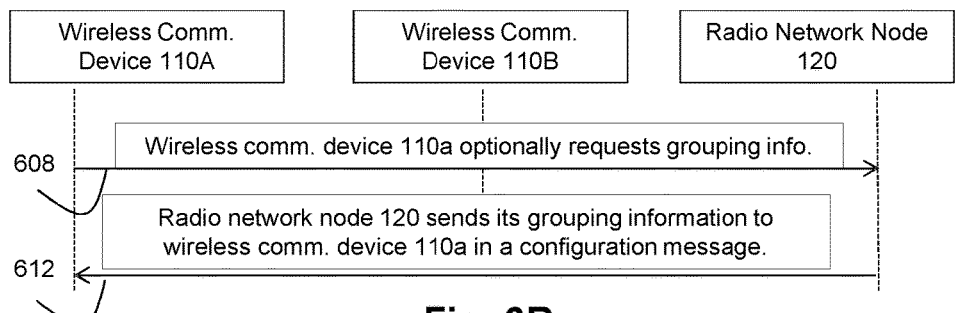
Figure 6C:
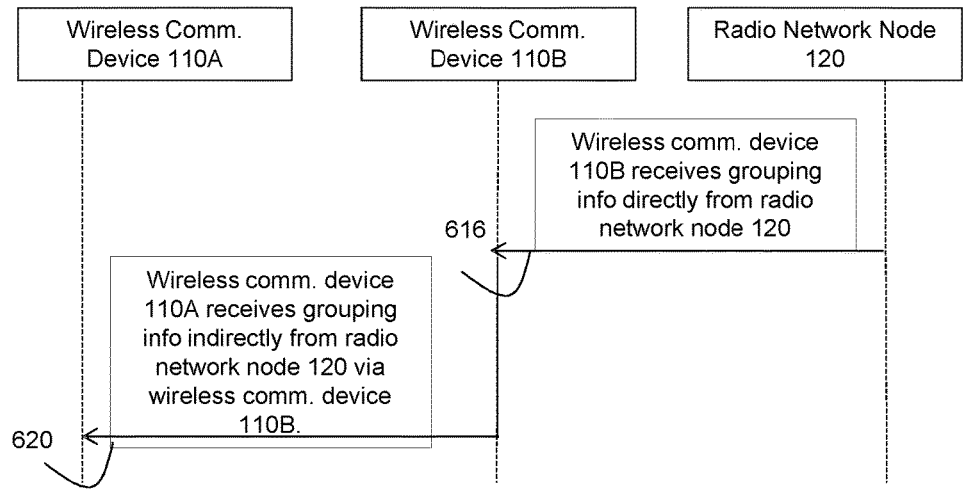

FIGS. 6A-6C are signalling diagrams illustrating example message flows where a radio network node 120a sends wireless communication devices 110 grouping information for device-to-device services under the control of radio network node 120a. A D2D wireless communication device 110a uses the grouping information from radio network node 120 to determine the suitable physical identities for transmitting relevant signals (e.g., synchronization sequence) depending upon the service(s) that wireless communication device 110a intends to offer. Wireless communication device 110a may also store the grouping information for use in D2D operation at a future time. For example, wireless communication device 110a can use the stored information to adapt its own physical identity in case it changes the type of service it intends to offer. In another example, wireless communication device 110a can use this information to determine another wireless communication device 110b that offers a desired D2D service. Wireless communication device 110a may also forward grouping information received from radio network node 120 to other D2D wireless communication devices 110.

FIG. 6A illustrates an example in which radio network node 120 sends grouping information to wireless communication devices 110 via a broadcast message 604. In FIG. 6A, wireless communication device 110a and wireless communication device 110b each obtain the broadcast message 604 directly from radio network node 120. Thus, in some embodiments, grouping information is provided to multiple wireless communication devices 110 simultaneously.

In some embodiments, radio network node 120 provides grouping information to one wireless communication device 110 at a time. For example, FIG. 6B illustrates an example in which radio network node 120 sends grouping information to a particular wireless communication device 110a via a configuration message 612. In this example, configuration message 612 is sent directly from radio network node 120 to wireless communication device 110. Radio network node 120 sends the configuration message 612 to wireless communication device 110a according to a time interval or other criteria (without having to wait for wireless communication device 110 to request the grouping information) and/or radio network node 120 sends the configuration message 612 in response to receiving a request for grouping information 608 from wireless communication device 110a.

FIG. 6C illustrates an example where at step 616 wireless communication device 110b receives grouping information directly from radio network node 120. Wireless communication device 110b may receive the grouping information in a broadcast message (as described with respect to FIG. 6A) or a configuration message (as described with respect to FIG. 6B). At step 620, wireless communication device 110b forwards the grouping information to another wireless communication device 110a. Thus, wireless communication device 110a receives the grouping information indirectly from radio network node 120 via wireless communication device 110b. Wireless communication device 110b may forward the grouping information in response to a request from wireless communication device 110a or on its own initiative.

Figure 7:
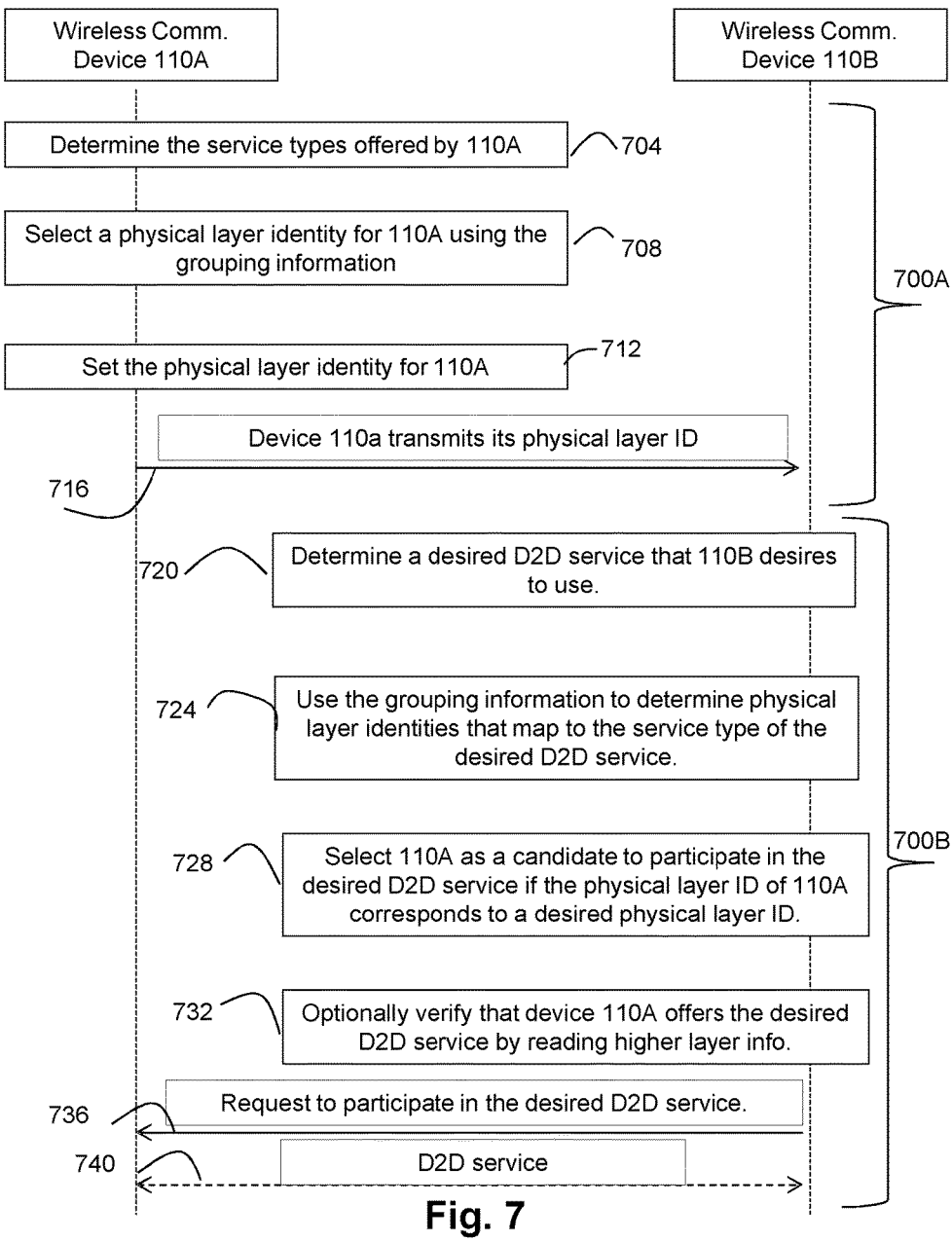
FIG. 7 is a signalling diagram illustrating an example message flow for setting up a device-to-device service between a serving wireless communication device and a beneficiary wireless communication device.

FIG. 7 is a signalling diagram illustrating an example message flow for setting up a device-to-device service between a serving wireless communication device 110a and a beneficiary wireless communication device 110b. In part 700A, a first wireless communication device 110a uses grouping information to set its physical identity in order to indicate the services for which it is capable of acting as a serving D2D device. In part 700B, a second wireless communication device 110b acts as a beneficiary D2D device and uses the grouping information to determine one or more serving D2D device(s) offering its desired service. As an example, the grouping information may be according to Table 5.

TABLE 5

Example mapping between wireless communication device physical identities and their service types

| Group of Physical Layer IDs | | Mapping to service type | |
| --- | --- | --- | --- |
| Group No. | Range of Physical Layer IDs | Service ID | Service type |
| 1 | 0 . . . 159 | 0 | NSPS |
| 2 | 160 . . . 199 | 1 | Relaying |

At step 704, the first wireless communication device 110a determines one or more of the service types that it offers. The service types may be determined based on one or more of stored data or higher layer data indicating device-to-device capabilities of the first wireless communication device 110a. As an example, the first wireless communication device 110a may determine that it offers an NSPS service.

At step 708, the first wireless communication device 110a uses the grouping information to select one of the physical identities. The selected physical identity maps to the service type(s) being offered by the first wireless communication device 110a. Using the grouping information of Table 5 as an example, the first wireless communication device 110a selects a physical identity, such as 99, which is within the range of 0 to 159 and therefore corresponds to the NSPS service.

At step 712, the first wireless communication device 110a sets the selected physical identity (99) as an identifier of the wireless communication device and at step 716 the first wireless communication device 110a transmits the selected physical identity (99) as an indicator of the service types (NSPS) being offered by the first wireless communication device 110a. For example, the first wireless communication device 110a encodes physical identity (99) with or maps physical identity (99) to the physical signal that it transmits to assist a peer/second D2D wireless communication device 110b in synchronizing to the first wireless communication device 110a. Examples of the physical signal include pilot or reference signal (e.g., sounding reference signal (SRS)), synchronization signal (e.g., PSS/SSS), etc.

At step 720, the second wireless communication device 110b determines a desired device-to-device service that it desires to use, such as the NSPS service. At step 724, the second wireless communication device 110b uses the grouping information to determine one or more desired physical identities, wherein the desired physical identities map to the service type of the desired device-to-device service. Using the grouping information of Table 5 as an example, the second wireless communication device 110b determines that physical identities within the range of 0 to 159 correspond to the NSPS service and are therefore desired physical identities.

At step 728, the second wireless communication device 110b selects one or more other wireless communication devices 110 as candidates to participate in the desired device-to-device service based on the physical identity. For example, the second wireless communication 110b device selects wireless communication device 110a as a candidate to provide the desired device-to-device service (NSPS) because the physical identity of wireless communication device 110a corresponds to one of the desired physical identities (99 is within the range of 0-159). In some embodiments, second wireless communication device 110b determines the candidate to provide the desired device-to-device service by correlating over physical signals that encode the physical identity of the other wireless communication devices. If the output of the correlation operation is above a threshold then the wireless communication device 110b determines that wireless communication device 110a is available for offering the desired service (e.g., NSPS). Wireless communication device 110b may also select the best possible wireless communication device 110 for getting its desired service based on the highest correlation value among a plurality of wireless communication devices 110.

At step 732, wireless communication device 110b may additionally and optionally carry out a verification procedure to further confirm the type of service offered by wireless communication device 110a. In the verification procedure wireless communication device 110b acquires wireless communication device 110a's system information or other higher layer information, where the higher layer information corresponds to a layer that is higher than the physical layer. The higher layer information carries explicit information about the offered service (e.g., that device 110a offers the NSPS service). The type of service offered by wireless communication device 110a is confirmed if the outcome of the correlation based on physical identity (step 728) is the same as the verification based on higher layer information, such as system information (e.g., both the physical identity correlation and the system information indicate that wireless communication device 110a provides the NSPS service).

In some embodiments, wireless communication device 110b determines to read the higher layer information transmitted by wireless communication device 110a only if the physical identity of wireless communication device 110a corresponds to one of the desired physical identities determined at step 724 (in the example, physical identities within the range of 0-159). Thus, wireless communication device 110b determines not to read the higher layer information transmitted by wireless communication device 110a if the physical identity of wireless communication device 110a does not correspond to one of the desired physical identities determined at step 724 (in the example, physical identities outside the range of 0-159). Reading higher layer information only from the subset of wireless communication devices 110 that have a desired physical identity conserves resources because the higher layer information need not be read from wireless communication devices 110 that, based on the physical identity, are unlikely to offer the desired service.

After determining that wireless communication device 110a offers the desired service (e.g., NSPS service), at step 736 wireless communication device 110B sends wireless communication device 110a a request to participate in the desired D2D service (e.g., the NSPS service). Wireless communication devices 110a and 110b participate in the D2D service at step 740. The method of FIG. 7 then ends.

In some embodiments, wireless communication device 110 sends grouping capabilities information to radio network node 120 or to another wireless communication device 110. The grouping capabilities information indicates one or more of: if the wireless communication device 110 is capable of obtaining the grouping information from the radio network node 120; if the wireless communication device 110 is capable of setting its physical identity based on the grouping information from the radio network node 120; and if the wireless communication device 110 is capable of using the grouping information from the radio network node 120 to determine the service types offered by other wireless communication devices 110.

The grouping capabilities information may also contain additional or more specific information such as: if the wireless communication device 110 can obtain the grouping information only from a radio network node 120, from another wireless communications device 110, or from both; if the wireless communication device 110 can obtain and use the grouping information only for a specific frequency band; and if the wireless communication device 110 can obtain and use the grouping information only in uplink radio resources (e.g., UL carrier frequency and/or UL subframes and/or UL resource blocks), only in downlink radio resources (e.g., DL carrier frequency and/or DL subframes and/or DL resource blocks), or any of UL or DL radio resources. The grouping capabilities information may also contain any additional information or parameters described with respect to FIGS. 2-7.

Wireless communication device 110 may send the grouping capabilities information using proactive reporting (without receiving any explicit request from the radio network node 120 or other wireless communication device 110) or in response to receiving an explicit request from another node (the radio network node 120 or another wireless communication device 110). The explicit request can be sent to the wireless communication device 110 by the other node anytime or at any specific occasion. For example the request for the capability reporting can be sent to wireless communication device 110 during initial setup or after a cell change (e.g., handover, radio resource control (RRC) connection re-establishment, RRC connection release with redirection, Primary Cell change in Carrier Aggregation, Primary Component Carrier (PCC) change in PCC, etc.). In the case of proactive reporting, wireless communication device 110 may report its capability during one or more of the following occasions: during initial setup or call setup with radio network node 120 or with another D2D wireless communication device 110 (e.g., when establishing the RRC connection); or during cell change (e.g., handover, primary carrier change in multi-carrier operation, Primary Cell change in multi-carrier operation, RRC re-establishment, RRC connection release with redirection, etc.).

The acquired grouping capabilities information may be used by radio network node 120 (e.g., eNode B, base station, etc.) and/or by other wireless communication devices 110 for performing one or more radio operation tasks or network management tasks, such as: forwarding the received grouping capabilities information to another radio network node 120 which may use it after cell change of the wireless communication device 110; deciding, by the radio network node 120 whether to partition wireless communication device physical identities in groups corresponding to different services or not (e.g., if the grouping capabilities information received from the majority of wireless communication devices 110 indicate that grouping information is not supported, radio network node 120 would decide not to partition the physical identities); performing, by another wireless communication device 110, one or more tasks related to D2D operation such as deciding whether to adapt its own physical identity or not (e.g., if device 110a determines that the grouping capabilities information indicates device 110b can obtain service offerings using the physical identity, device 110a would decide to adapt its physical identity).

Figure 8:
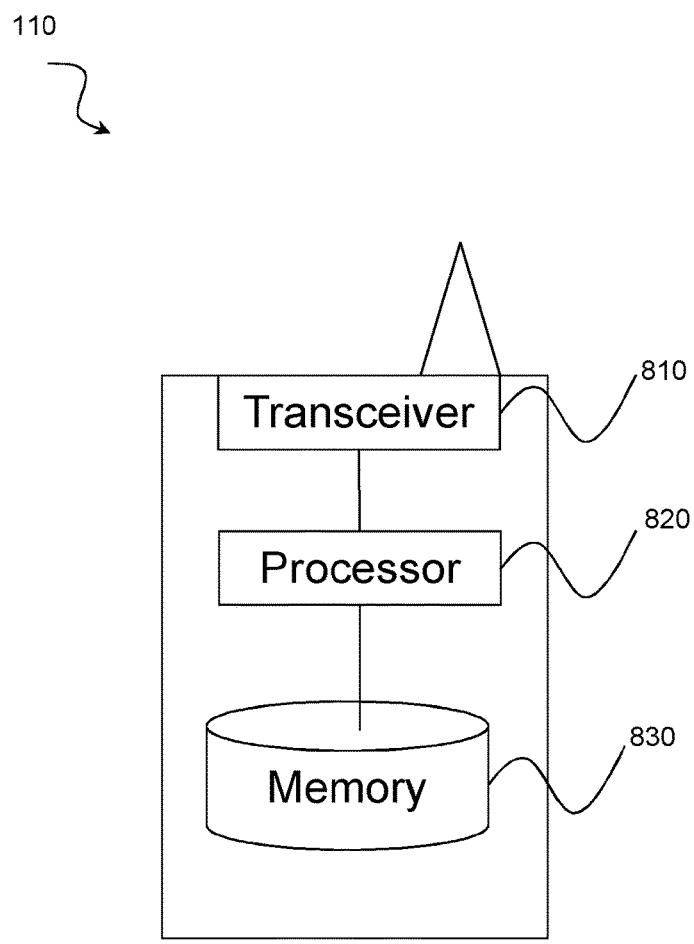
FIG. 8 is a block diagram illustrating an example of a wireless communication device.

FIG. 8 is a block schematic of an exemplary wireless communication device 110 suitably operative in accordance with the principles of the invention. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 includes at least a transceiver 810, a processor 820, and a memory 830. In some embodiments, transceiver 810 facilitates transmitting wireless signals to and receiving wireless signals from radio network node 120 (e.g., via an antenna), processor 820 executes instructions to provide some or all of the functionality described herein as provided by a wireless communication device 110, and memory 830 stores the instructions executed by processor 820.

Processor 820 includes any suitable combination of hardware and software implemented in one or more integrated circuits or modules to execute instructions and manipulate data to perform some or all of the described functions of wireless communication device 110. Memory 830 is generally operable to store computer executable code and data. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 8) responsible for providing certain aspects of the mobile device's functionality, including any of the functionality described above and/or any additional functionality (including any functionality necessary to support the solution described above).

Figure 9:
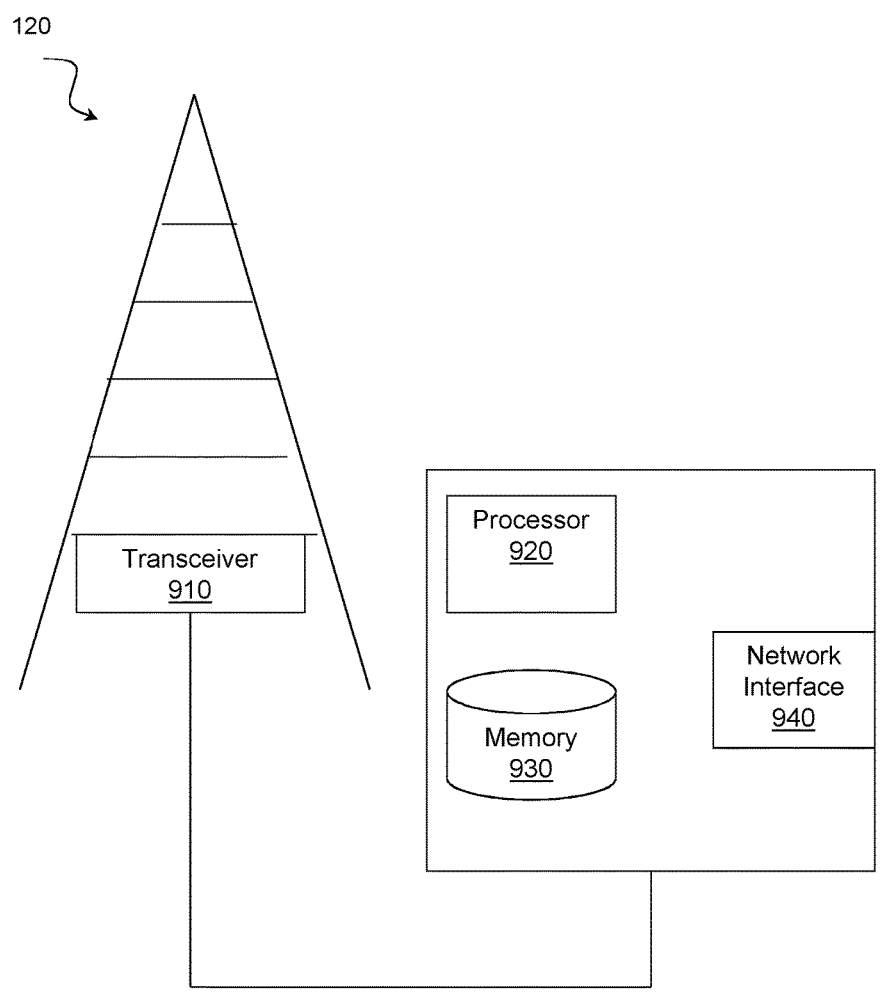
FIG. 9 is a block diagram illustrating an example of a radio network node.

FIG. 9 is a block schematic of an exemplary radio network node 120 suitably operative in accordance with the principles of the invention. Radio network node 120 can be, for example, a radio access node, such as an eNodeB, a node B, a base station, a wireless access point (e.g., a Wi-Fi access point), a low power node, a base transceiver station (BTS), a transmission point or node, or a remote RF unit (RRU). Other network nodes, such as one or more radio network controllers, can be configured between the radio access nodes and core network nodes 130. Such other network nodes can include processors, memory, and interfaces similar to those described with respect to FIG. 9; such other network nodes, however, might not necessarily include a wireless interface, such as transceiver 910.

Radio network node 120 includes at least one processor 920, at least one memory 930, and at least one network interface 940; in certain embodiments, radio network node 120 can also include a transceiver 910. Transceiver 910 facilitates transmitting wireless signals to and receiving wireless signals from wireless communication device 110 (e.g., via an antenna); processor 920 executes instructions to provide some or all of the functionality described above as being provided by a radio network node 120; memory 930 stores the instructions executed by processor 920; and network interface 940 communicates signals to backend network components, such as a gateway, switch, router, Internet, Public Switched Telephone Network (PSTN), other radio network nodes 120, and/or core network nodes 130. The processor 920 and memory 930 can be of the same types as described supra with respect to FIG. 8.

In some embodiments, network interface 940 is communicatively coupled to processor 920 and refers to any suitable device operable to receive input for radio network node 120, send output from radio network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

Other embodiments of radio network node 120 include additional components (beyond those shown in FIG. 9) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 10:
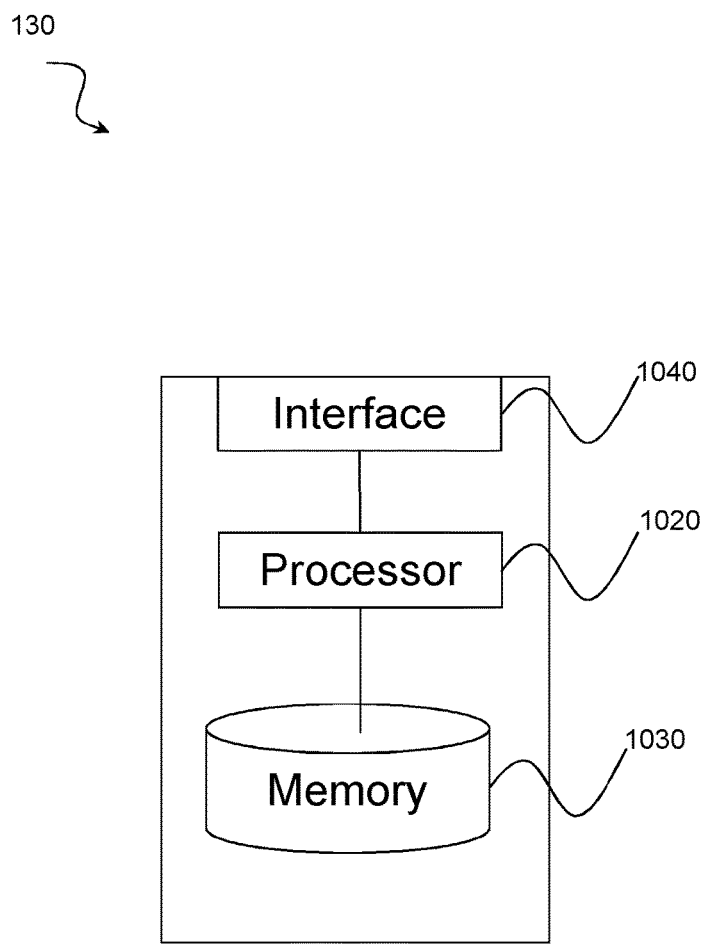
FIG. 10 is a block diagram illustrating an example of a core network node.

FIG. 10 is a block schematic of an exemplary core network node 130 suitably operative in accordance with the principles of the invention. Examples of a core network node 130 include, but are not limited to, a mobile switching center (MSC), a serving GPRS support node (SGSN), a mobility management entity (MME), a radio network controller (RNC), and a base station controller (BSC). Core network node 130 includes at least a processor 1020, a memory 1030, and a network interface 1040. Processor 1020 executes instructions to provide some or all of the functionality described above as being provided by core network node 130; memory 1030 stores the instructions executed by processor 1020; and network interface 1040 communicates signals to other network nodes. The processor 1020 and memory 1030 can be of the same types as described supra with respect to FIG. 8.

In some embodiments, network interface 1040 is communicatively coupled to processor 1020 and may refer to any suitable device operable to receive input for core network node 130, send output from core network node 130, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network. Other embodiments of core network node 130 include additional components (beyond those shown in FIG. 10) responsible for providing certain aspects of the core network node's functionality, including any of the functionality described above and/or any additional functionality (including any functionality necessary to support the solution described above).

Figure 11:
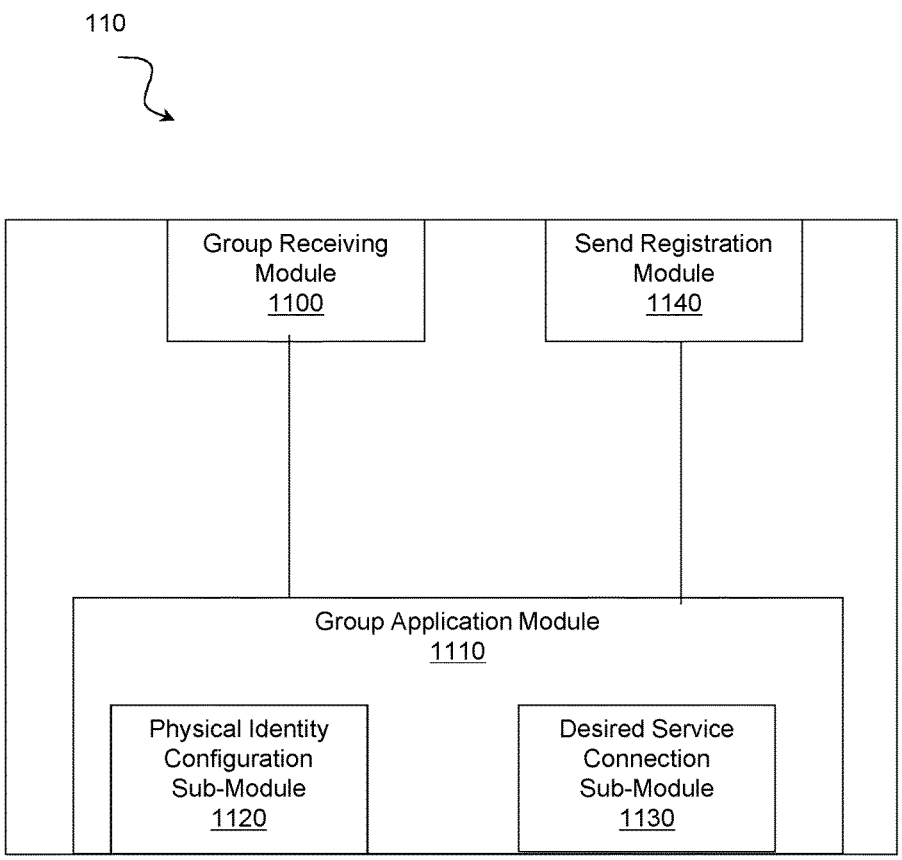
FIG. 11 is a block diagram illustrating an example of a wireless communication device operable to use grouping information for device-to-device services.

FIG. 11 is a block diagram illustrating an example of a wireless communication device 110 operable to use grouping information for device-to-device services according to some embodiments. Wireless communication device 110 may include a group receiving module 1100, a group application module 1110, and optionally a send registration module 1140. Group application module 1110 includes physical identity configuration sub-module 1120 and/or a desired service connection sub-module 1130.

Group receiving module 1100 receives grouping information from a radio network node 120. The grouping information indicates a plurality of service types associated with device-to-device services being offered or expected to be offered by wireless communication devices within coverage of radio network node 120. The grouping information comprises one or more groups and each group includes a plurality of physical identities and one or more of the service types that map to the physical identities in that group. Group application module 1110 uses the grouping information in connection with device-to-device operation.

In some embodiments, group application module 1110 includes physical identity configuration sub-module 1120 for selecting a physical identity that maps to the service types being offered by wireless communication device 110. Physical identity configuration sub-module 1120 sets the selected physical identity as an identifier of wireless communication device 110 and transmits the selected physical identity for receipt by a second wireless communication device. The physical identity indicates to the second wireless communication device which service types are being offered by wireless communication device 110.

In some embodiments, group application module 1110 includes desired service connection sub-module 1130, which uses the grouping information to determine one or more desired physical identities mapping to the service type of the device-to-device service that wireless communication device 110 desires to use. Desired service connection sub-module 1130 selects a second wireless communication device as a candidate to participate in the desired device-to-device service if the physical identity of the second wireless communication device corresponds to one of the desired physical identities. Desired service connection sub-module 1130 then sends the second wireless communication device a request to participate in the desired device-to-device service.

In some embodiments, desired service connection sub-module 1130 uses higher layer information to verify whether the second wireless communication device offers the desired device-to-device service. Desired service connection sub-module 1130 determines to read the higher layer information transmitted by a second wireless communication device if the physical identity of the second wireless communication device corresponds to one of the desired physical identities and determines not to read the higher layer information transmitted by the second wireless communication device if the physical identity of the second wireless communication device does not correspond to one of the desired physical identities. If the higher layer information is read, desired service connection sub-module 1130 determines whether the second wireless communication device offers the desired device-to-device service based on the higher layer information.

Send registration module 1140 sends a service registration to radio network node 120. The service registration indicates one or more of the device-to-device services being offered or expected to be offered by wireless communication device 110. In some embodiments, send registration module 1140 may send radio network node 120 grouping capabilities information. The grouping capabilities information indicates if wireless communication device 110 is capable of obtaining the grouping information from radio network node 120, if wireless communication device 110 is capable of setting its physical identity based on the grouping information from radio network node 120, and/or if wireless communication device 110 is capable of using the grouping information from radio network node 120 to determine the service types offered by other wireless communication devices.

Figure 12:
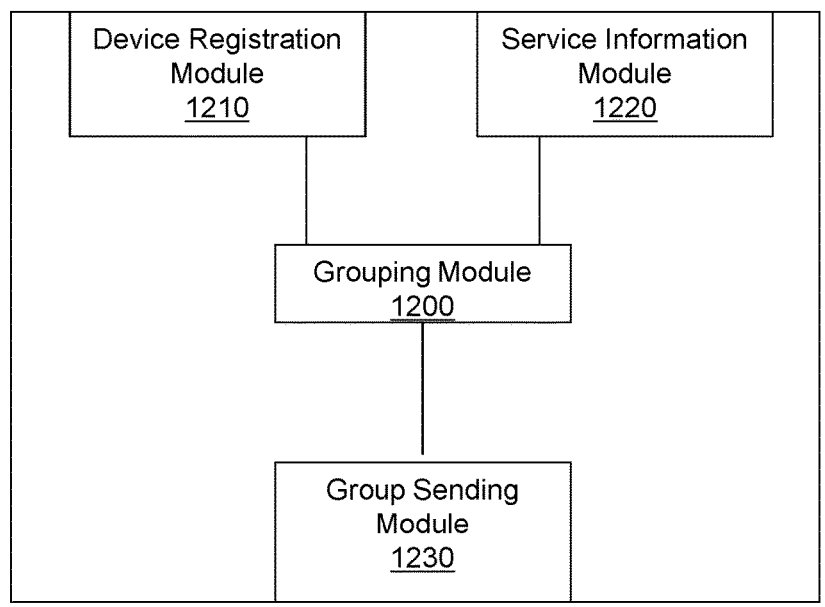
FIG. 12 is a block diagram illustrating an example of a radio network node operable to provide grouping information to wireless communication devices using device-to-device services.

FIG. 12 is a block diagram illustrating an example of a radio network node 120 operable to provide grouping information to wireless communication devices using device-to-device services according to some embodiments. Radio network node 120 includes a grouping module 1200 and a group sending module 1230 and optionally includes a device registration module 1210 and/or a service information module 1220. Grouping module 1200 groups physical identities being used or expected to be used by wireless communication devices 110 under the control of radio network node 120 into one or more groups. At least one of the groups is mapped to one or more service types associated with device-to-device services being offered or expected to be offered by wireless communication devices 110. In some embodiments, grouping module 1200 dynamically adjusts a number of physical identities assigned to a particular group based on changes to the proportion of the wireless communication devices 110 that offer or are expected to offer the service type(s) associated with the particular group, for example, based on information received from device registration module 1210 and/or service information module 1220.

Device registration module 1210 receives service registrations from one of the wireless communication devices 110 under the control of radio network node 120. The service registrations indicate one or more of the device-to-device services being offered or expected to be offered by that wireless communication device 110. Device registration module 1220 communicates with grouping module 1200 to include the service types of the device-to-device services indicated by the service registration in at least one of the groups.

In some embodiments, wireless communication devices 110 register grouping capabilities information with device registration module 1210. The grouping capabilities information indicates if the wireless communication device is capable of obtaining the grouping information from the radio network node, if the wireless communication device is capable of setting its physical identity based on the grouping information from the radio network node, and/or if the wireless communication device is capable of using the grouping information from the radio network node to determine the service types offered by other wireless communication devices. Device registration module 1210 communicates with group sending module 1230 to determine if and when to send the grouping information to one of the wireless communication devices 110 based on the grouping capabilities information.

Service information module 1220 receives service information from a core network node 130. The service information indicates one or more of the device-to-device services being offered or expected to be offered by one of the wireless communication devices 110 under the control of radio network node 120. Service information module communicates with grouping module 1200 to include the service types of the device-to-device services indicated by the service information in at least one of the groups. Service information module may be optional depending on the embodiment.

Group sending module 1230 sends wireless communication devices 110 grouping information that indicates the physical identities and the service type(s) for each of one or more of the groups configured by grouping module 1200.

Some embodiments of the disclosure may provide one or more technical advantages. Some embodiments may benefit from some, none, or all of these advantages. Other technical advantages may be readily ascertained by one of ordinary skill in the art. A technical advantage of some embodiments allows a wireless communication device (e.g., device A) to relatively quickly and efficiently determine one or more other wireless communication devices (e.g., devices B-N) offering a desired D2D service. During synchronization procedures, device A can read physical layer information to determine the D2D services offerings of devices B-N. Thus, device A may not have to read higher layer information (i.e., system information) of devices B-N when determining the services offered by devices B-N. Thus, complexity and/or energy consumption at device A may be reduced. In some embodiments, devices B-N may indicate their respective D2D service offerings without having to send additional bits in pilot/sync signals.

As another example, a technical advantage of some embodiments may include adapting the mapping between physical identities (e.g., LDIDs) and services in a semi-static manner, for example, depending upon the D2D services that the wireless communication devices intend to offer. Particular embodiments may enable D2D wireless communication devices to meet regulatory requirements by quickly determining other D2D wireless communication devices in emergency situations related to public safety.

In some embodiments, a network node, such as a base station, may signal (e.g., broadcast or unicast) a mapping between physical layer IDs and service types. In some embodiments, the mapping can change over time and need not be hard coded. The mapping may allow wireless communication devices to announce their offered D2D service(s) by transmitting their beacon signals using physical layer ID selected based on the mapping received from the network. For example, device A announces its service based on physical layer signals. As a result, device B can detect whether device A offers the service(s) that device B desires. So, device B can detect other D2D wireless communications devices offering its desired service quickly by correlating over beacon signals. In some embodiments, device B can also get higher layer information to get more details or further checking.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. As an example, although certain embodiments have been described in the context of long term evolution (LTE), other embodiments may use LTE-Advanced, UMTS, HSPA, GSM, cdma2000, WiMax, WiFi, and/or other suitable radio access technology or combination of radio access technologies.

The above description of the embodiments does not constrain this disclosure. Other changes, substitutions, and alterations are possible without departing from the spirit and scope of this disclosure, as defined by the following claims.

The invention claimed is:

1. A radio network node capable of assisting device-to-device operation, characterized in that the radio network node comprises one or more processors being operable to:
    group physical identities being used or expected to be used by wireless communication devices under the control of the radio network node into one or more groups, where at least one of the groups is mapped to one or more service types associated with device-to-device services being offered or expected to be offered by the wireless communication devices; and
    send grouping information that indicates the physical identities and the service type(s) for each of one or more of the groups;
    receive a service registration from one of the wireless communication devices under the control of the radio network node, the service registration indicating one or more of the device-to-device services being offered or expected to be offered by that wireless communication device; and
    include the service types of the device-to-device services indicated by the service registration in at least one of the groups.

2. The radio network node of claim 1, further comprising a memory wherein said memory is containing instructions executable by said one or more processors.

3. The radio network node of claim 1, wherein the radio network node is further operable to:
    receive service information from a core network node, the service information indicating one or more of the device-to-device services being offered or expected to be offered by one of the wireless communication devices under the control of the radio network node; and
    include the service types of the device-to-device services indicated by the service information in at least one of the groups.

4. The radio network node of claim 1, wherein the radio network node sends the grouping information in a broadcast message to the wireless communication devices or in a configuration message to a particular wireless communication device.

5. A wireless communication device capable of device-to-device operation, characterized in that the wireless communication device comprises one or more processors being operable to:
    receive grouping information from a radio network node, the grouping information indicating a plurality of service types associated with device-to-device services being offered or expected to be offered, wherein the grouping information comprises one or more groups and each group includes a plurality of physical identities and one or more of the service types that map to the physical identities in that group; and
    use the grouping information in connection with device-to-device operation;

determine one or more of the service types being offered by the wireless communication device;

use the grouping information to select one of the physical identities, wherein the selected physical identity maps to the service types being offered by the wireless communication device;

set the selected physical identity as an identifier of the wireless communication device; and transmit the selected physical identity for receipt by a second wireless communication device, the physical identity indicating to the second wireless communication device which service types are being offered by the wireless communication device.

6. The wireless communication device of claim 5, further comprising a memory wherein said memory is containing instructions executable by said one or more processors.

7. The wireless communication device of claim 5, wherein the wireless communication device determines the one or more of the service types being offered by the wireless communication device based on one or more of stored data or higher layer data indicating device-to-device capabilities of the wireless communication device.

8. A method in a radio network node for assisting device-to-device operation, the method comprising:

grouping physical identities being used or expected to be used by wireless communication devices under the control of the radio network node into one or more groups, where at least one of the groups is mapped to one or more service types associated with device-to-device services being offered or expected to be offered by the wireless communication devices; and sending grouping information that indicates the physical identities and the service type(s) for each of one or more of the groups;

receiving a service registration from one of the wireless communication devices under the control of the radio network node, the service registration indicating one or more of the device-to-device services being offered or expected to be offered by that wireless communication device; and including the service types of the device-to-device services indicated by the service registration in at least one of the groups.

9. The method of any of claim 8, further comprising:

receiving service information from a core network node, the service information indicating one or more of the device-to-device services being offered or expected to be offered by one of the wireless communication devices under the control of the radio network node; and including the service types of the device-to-device services indicated by the service information in at least one of the groups.

10. The method of claim 8, wherein the grouping information is sent in a broadcast message to the wireless communication devices or in a configuration message to a particular wireless communication device.

11. The method of claim 8, wherein the grouping information is sent to a second radio network node.

12. A method in a wireless communication device for device-to-device operation, the method comprising:

receiving grouping information from a radio network node, the grouping information indicating a plurality of service types associated with device-to-device services being offered or expected to be offered, wherein the grouping information comprises one or more groups and each group includes a plurality of physical identities and one or more of the service types that map to the physical identities in that group; and using the grouping information in connection with device-to-device operation;

determining one or more of the service types being offered by the wireless communication device;

using the grouping information to select one of the physical identities, wherein the selected physical identity maps to the service types being offered by the wireless communication device;

setting the selected physical identity as an identifier of the wireless communication device; and transmitting the selected physical identity for receipt by a second wireless communication device, the physical identity indicating to the second wireless communication device which service types are being offered by the wireless communication device.

13. The method of claim 12, wherein the one or more of the service types being offered by the wireless communication device are determined based on one or more of stored data or higher layer data indicating device-to-device capabilities of the wireless communication device.

14. The method of claim 12, wherein using the grouping information in connection with device-to-device operation comprises:

determining a desired device-to-device service that the wireless communication device desires to use;

using the grouping information to determine one or more desired physical identities, wherein the desired physical identities map to the service type of the desired device-to-device service;

selecting a second wireless communication device as a candidate to participate in the desired device-to-device service if the physical identity of the second wireless communication device corresponds to one of the desired physical identities; and sending the second wireless communication device a request to participate in the desired device-to-device service.

15. The method of claim 12, further comprising:

determining a desired device-to-device service that the wireless communication device desires to use;

using the grouping information to determine one or more desired physical identities, wherein the desired physical identities map to the service type of the desired device-to-device service;

determining to read higher layer information transmitted by a second wireless communication device if the physical identity of the second wireless communication device corresponds to one of the desired physical identities, wherein the higher layer corresponds to a layer higher than the physical layer;

determining not to read the higher layer information transmitted by the second wireless communication device if the physical identity of the second wireless communication device does not correspond to one of the desired physical identities; and if the higher layer information is read, determining whether the second wireless communication device offers the desired device-to-device service based on the higher layer information.

* * * * *